(12) United States Patent
Kresina

(10) Patent No.: US 8,224,771 B2
(45) Date of Patent: Jul. 17, 2012

(54) RESOURCE SHARING FOR DOCUMENT PRODUCTION

(75) Inventor: Roman Kresina, Oxford, CT (US)

(73) Assignee: Neopost Technologies, Bagneux (FR)

( * ) Notice: Subject to any disclaimer, the term of this patent is extended or adjusted under 35 U.S.C. 154(b) by 1091 days.

(21) Appl. No.: 12/024,045

(22) Filed: Jan. 31, 2008

(65) Prior Publication Data

US 2009/0199180 A1 Aug. 6, 2009

(51) Int. Cl.
*G06F 17/30* (2006.01)
*G06Q 30/00* (2012.01)

(52) U.S. Cl. .......................... 707/609; 705/405; 705/54

(58) Field of Classification Search .................. 709/201; 707/999.01
See application file for complete search history.

(56) References Cited

U.S. PATENT DOCUMENTS

| | | | | | |
|---|---|---|---|---|---|
| 5,262,597 | A | * | 11/1993 | Johnson, Jr. .................... | 177/50 |
| 5,347,145 | A | * | 9/1994 | Tanaka et al. .................... | 257/48 |
| 5,459,670 | A | * | 10/1995 | Johnson et al. ............... | 700/224 |
| 5,485,369 | A | * | 1/1996 | Nicholls et al. .............. | 705/7.13 |
| 5,546,577 | A | * | 8/1996 | Marlin et al. .......................... | 1/1 |
| 5,606,693 | A | * | 2/1997 | Nilsen et al. .......................... | 1/1 |
| 5,612,889 | A | * | 3/1997 | Pintsov et al. .................. | 700/226 |
| 5,631,827 | A | * | 5/1997 | Nicholls et al. ................. | 705/28 |
| 5,633,794 | A | * | 5/1997 | Yang .............................. | 370/221 |
| 5,666,421 | A | * | 9/1997 | Pastor et al. .................... | 380/51 |
| 5,668,990 | A | * | 9/1997 | Bajorinas et al. .................... | 1/1 |
| 5,680,615 | A | * | 10/1997 | Marlin et al. .......................... | 1/1 |
| 5,734,697 | A | * | 3/1998 | Jabbarnezhad ............ | 379/14.01 |
| 5,758,074 | A | * | 5/1998 | Marlin et al. .................. | 709/250 |
| 5,778,377 | A | * | 7/1998 | Marlin et al. .......................... | 1/1 |
| 5,878,136 | A | * | 3/1999 | Kim et al. ........................ | 705/60 |
| 5,910,896 | A | * | 6/1999 | Hahn-Carlson ............... | 700/231 |
| 5,936,865 | A | * | 8/1999 | Pintsov et al. ................. | 700/107 |
| 5,940,841 | A | * | 8/1999 | Schmuck et al. ...................... | 1/1 |
| 6,058,193 | A | * | 5/2000 | Cordery et al. ............... | 380/284 |
| 6,098,032 | A | * | 8/2000 | Brookner ....................... | 702/182 |
| 6,135,292 | A | * | 10/2000 | Pettner .......................... | 209/603 |
| 6,141,654 | A | * | 10/2000 | Heiden et al. .................. | 705/408 |
| 6,154,733 | A | * | 11/2000 | Pierce et al. ................... | 705/408 |
| 6,173,274 | B1 | * | 1/2001 | Ryan, Jr. ....................... | 705/408 |
| 6,178,410 | B1 | * | 1/2001 | Kunde et al. ................... | 705/406 |
| 7,159,217 | B2 | * | 1/2007 | Pulsipher et al. ............. | 718/100 |
| 7,685,224 | B2 | * | 3/2010 | Nye ............................... | 709/201 |
| 2003/0130963 | A1 | * | 7/2003 | Stickler et al. ................ | 705/401 |
| 2004/0034550 | A1 | * | 2/2004 | Menschik et al. ................ | 705/3 |
| 2006/0080702 | A1 | * | 4/2006 | Diez et al. ....................... | 725/30 |
| 2006/0112176 | A1 | * | 5/2006 | Liu et al. ....................... | 709/223 |
| 2006/0184931 | A1 | * | 8/2006 | Rochette et al. .............. | 717/169 |
| 2006/0271424 | A1 | * | 11/2006 | Gava et al. ...................... | 705/14 |
| 2009/0070338 | A1 | * | 3/2009 | Spitzig et al. .................. | 707/10 |

\* cited by examiner

*Primary Examiner* — Evens J Augustin
(74) *Attorney, Agent, or Firm* — Morris & Kamlay LLP

(57) ABSTRACT

A system for resource sharing for document production. Available resources are determined for performing at least one document production task. The capacity of an available resource is determined. A task is selecting to send to the resource based at least partly on its availability. An identifier is associating with a set of task data, which can include document data and insertion data. The identifier can be used to track the progress and completion of the task. The task can be sent to the resource for processing. The completed task is received from the resource.

28 Claims, 1 Drawing Sheet

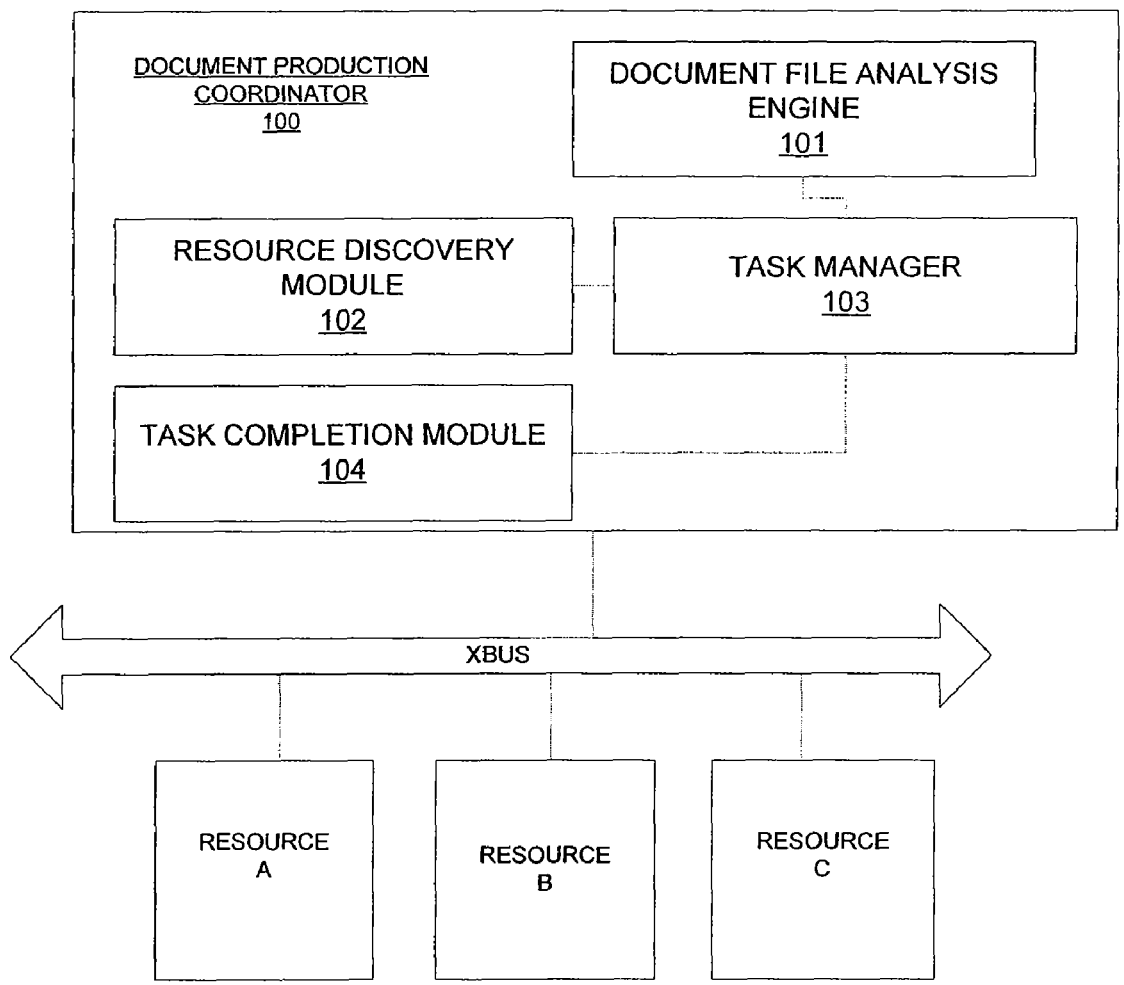

RESOURCE SHARING FOR DOCUMENT PRODUCTION

CROSS-REFERENCES TO RELATED APPLICATIONS

NOT APPLICABLE

FIELD OF THE INVENTION

The field of the invention is a document production system, and in particular a distributed document production system for mailpieces.

BACKGROUND OF THE INVENTION

Document production for a set of mailpieces can be resource-intensive. The tasks of merging, inserting and combining different types of content to form hundreds or thousands of mailpieces can overwhelm a single processor, causing a job to take hours to complete. At the same time, there can be several machines with excess processor power that is largely idle. What is needed is a reliable way of distributing the document production tasks to the machines with available processor power to efficiently complete the tasks needed to form mailpieces.

BRIEF DESCRIPTION OF THE DRAWINGS

FIG. 1 shows a system in accordance with an embodiment of the present invention.

DETAILED DESCRIPTION OF THE INVENTION

An embodiment of the present invention can be implemented using XBUS technology described in co-pending U.S. patent application Ser. No. 11/243,409, "A Message Based Application Communication System", filed on Oct. 4, 2005, which is incorporated by reference herein in its entirety. The XBUS provides for a way of communicating between resources on a network.

In accordance with an embodiment of the present invention, a first document production device can be bridged to other devices having available processing resources through a document production coordinator. The document production coordinator can have at least one subscription list that includes the document production device and one or more of the other devices. A message can be sent from the document production device to the coordinator, which can assess identify which other devices are subscribed, which have available resources, and the type and extent of the available resources. Based upon this determination and the nature of the message, the coordinator can send the message to an available device. Alternatively, the coordinator can send a request to the document production device requesting further information, which it can format into one or more messages and send to the available resource for processing. In this way, tasks of the document production device can be distributed for processing by other available resources, thereby speeding the completion of the tasks and taking advantage of processing resources that would otherwise be idle.

An XML Message Bus (XBUS) can be a transmission control protocol (TCP) based message exchange mechanism having a central server. In accordance with an embodiment of the present invention, the coordinator may have access through the XBUS to applications called XBUS Components (XCOMPs) that reside on other devices. An XCOMP can be written in any language and run on any operating system and can communicate with other XCOMPs using XML messages that conform to the XBUS protocol. The XCOMPs may be connected and disconnected at any time, although certain XCOMPs may stay connected on a long-term basis in order to provide services to other XCOMPs.

The XBUS may allow messaging to be directed between specific XCOMPs. The XBUS may also allow the XCOMPs the ability to subscribe to specific messages that are not sent to them directly. The latter can be used to broadcast event type messages that other XCOMPs can listen to without the need to know which XCOMPs are listening to the broadcast. The XBUS may be managed by an XBUS Service Manager (XSM). The XSM may be an NT service that is used to manage the XBUS and the associated XCOMPs or components. In various embodiments, any suitable managing device or software may be used to manage the XBUS.

The XBUS communication network may have any suitable configuration. For example, in a single machine configuration, there may be only one XBUS 100 that serves several XCOMPs. In this single machine configuration all the XCOMPs in the XBUS network can be considered to be peers of one another. In alternate embodiments, the XBUS network may have a multi-machine configuration in which one XBUS, such as for example the XBUS of a first machine serves clients on several other machines.

To facilitate larger XBUS networks an XBUS can be bridged to another XBUS through the use of an bridge. A bridge may allow an XCOMP connected to one XBUS to communicate with an XCOMP that may be connected to a different XBUS. A bridge may also control which messages are allowed to cross between XBUSes. The main purpose of bridging XBUSes is to allow local traffic with higher message volume while providing the ability to bridge certain messages between buses. For example, in accordance with an embodiment of the present invention, the coordinator is on a first XBUS and a device with available processor capacity is on a second XBUS. The messages comprising task assignments from the coordinator can be carried on the first XBUS to the bridge and to the second XBUS and finally to the available resource. Likewise, task completion traffic from the device (the available resource) can transit back to the first XBUS and through the bridge and on to the coordinator. The XBUS network may be made of a variety of XCOMPs, such as for example, XCOMPs that may be individual applications running on one or more machines. Each XCOMP only needs to connect to a central XBUS Server in order to communicate with any other XCOMP that is connected to the XBUS network.

An available resource may be an XTRAN application or server that can be connected to the XBUS network. XCOMPs that provide various services to other XCOMPs on the XBUS may be built upon XTRAN server functionality. An XTRAN Server can be analogous to the server component in a traditional client server architecture. XTRAN servers are typically the targets of request messages that require some response. For example, an XTRAN server can be an available resource, that is, a device having excess processing power that is available to perform a document production task in accordance with an embodiment of the present invention. In the XBUS architecture the concept of a transaction server is not limited to database transactions, instead a transaction server is used to efficiently provide business services to the rest of the XBUS network. In fact the utilization of the XBUS allows for the creation of an XML based transaction server that can appropriately respond to the unsolicited document production task messages it receives. The XTRAN server can be an XCOMP that hosts many message namespace stub objects for the purpose of efficiently processing request methods. Due to its multithreaded architecture, an XTRAN Server may handle multiple simultaneous request messages. Also, an XTRAN server may handle request messages for multiple message namespaces.

An XTRAN Server can use message stub classes that are created from the message schema in order to process request messages. With this flexibility, the same message stub class can be housed in a simple XCOMP or an XTRAN Server. Any XTRAN Server may be configurable as to which message namespaces they support as well as how many message stubs can be run simultaneously.

An XTRAN Server may own one or more XtranNamespaceHandlers. Each XtranNamespaceHandler, as seen in FIG. 10, registers itself with a Message Manager to receive the messages for the namespace that it handles. As request messages are received, they are queued up in a SemaphoreQueue. The XtranNamespaceHandlers may be configured to have one to many XTranStubHandlers, each of which may own a stub that handles messages for that namespace. Each of these XTranStubHandlers may be run on its own thread that wakes up as request messages are placed on the SemaphoreQueue. As soon as a message stub finishes processing a request message its XTranStubHandler waits for the next unhandled request message to appear on the SemaphoreQueue. An XTRAN server may support one or more XtranNamespaceHandlers.

The XTRAN Architecture is quite flexible in supporting a variety of "Transaction Server" models. The XTRAN architecture may support any desired feature including various features that may be tailored as appropriate to the desired "Transaction Server" application. When an XCOMP is connected to the XBUS network, the XBUS may assign a unique connection ID that may identify that XCOMP to the network. It is this ID that may be used by a given XCOMP when it sends a message to identify itself as the sender. This ID may also be used by other XCOMPs to address an end point or recipient of a message. For communication in the XBUS network, the XBUS supports any suitable message type including for example, request messages, response messages, one-way messages and event messages. Request messages are sent directly from one XCOMP to request information from another XCOMP. Response messages are sent from the XCOMP that receives a request message back to the XCOMP that sent the request message. One-way messages are sent when a response is not required. This type of message can also be referred to as "fire and forget". Event messages are broadcast messages that are sent by an XCOMP to notify other interested XCOMPs of some event that has occurred. The messages that travel along the XBUS network may be formatted to allow proper routing from one XCOMP to another. The message may include a header element and a body element that may aid the routing of the message.

A document production coordinator 100 in accordance with an embodiment of the present invention is shown in FIG. 1. Document file analysis engine 101 can analyzes document data to identify tasks for document production. For example, document file analysis engine 101 can identify a document in a document file containing an electronic representation of many documents. The analysis engine 101 can identify document production tasks that need to be completed for the document. For example, it can identify a text block that needs to be merged into the document, such as an destination address, a return address, customized text, and so on. It can determine that certain graphics need to be generated for the document. For example, the document may be an investment allocation pie chart that has to be generated based upon performance data that presently exists in the document only in tabular form. The graphic may be a barcode to be printed on one or more pages of the document for the purposes of tracking the document through the document and mailpiece production process and through processing by the carrier. It may be a value-bearing indicium such as an IBI or an IBI Lite. Analysis engine 101 can form a task message that can be delivered over the XBUS to an available device (a device with available processor power) that is also connected to the XBUS. Such a device can be remote from the document production coordinator. In forming the task message, it can include the necessary document data and insertion data that must be processed by a resource to complete the task. For example, document data can include the contents and layout of an incomplete document taken from the document printfile. Insertion data can represent content that needs to be merged with the incomplete document, such as destination address data or a graphic or the like, to make the document more or finally complete. The insertion data can include a graphic such as a value-bearing indicium and/or a barcode that encodes information identifying documents to be bundled into a mailpiece, a sequence number for the document, for example, for sorting the document into a batch of mail to qualify for reduced mailing rates, delivery mode information for determining if the mailpiece is to be sent via regular mail, fax, e-mail, internal mail, and so on. Insertion data may also include an advertisement, text that can be customized to the addressee, such as a personalized message. It may also include positioning data that can describe the layout of data to be merged or otherwise combined with the document data.

Resource discovery module 102 discovers the availability of resources. That is, it detects which devices have available processor power and the extent of the power available. The extent of the processor power available can be expressed in terms of processor cycles per second, the amount of time the device is expected to be available, and any other suitable measure of what contribution the device is capable of making in completing a task.

Task manager 103 is coupled to resource discovery module 102 and the document file analysis engine 101. Task manager assigns tasks to available resources based on information provided by resource discovery module 102 and task analysis engine 101. It can estimate the amount of processor power needed to complete a given task and match this against a device having sufficient available processor power to complete the task in a timely fashion. An identifier can be associated with task data, which can include document data and insertion data. The identifier can be used to track the progress and completion of the task.

Task manager 103 can track tasks assigned to available resources. It can add a task to a task-pending list for the resource when the task is sent to the resource and remove the task from the task-pending list when the task manager receives a signal from the task module that the completed task has been received.

Task completion module 104 is coupled to the task manager. It receives the completed tasks from the available device. The completed task can include the results of the processing done by the available resource, such as document data that has been processed to produce a graphic that is combined with the document data, a hash or digital signature of at least part of the document, a barcode such as and IBI that has been combined with the document, a digital copy of the completed mailpiece.

In accordance with one embodiment of the present invention, address data in the document data is cleansed, that is, placed into a standard format that can be specified by the carrier. The document with the cleansed addressed is included in the completed task received by from task completion module 104.

One of skill in the art will appreciate that the above description is meant to illustrate and not to limit the scope of the present invention. One of skill in the art will understand from the foregoing that additional embodiments of the present invention that are not described above are encompassed by the claims.

What is claimed is:

1. A computer-implemented method for resource sharing for document production, comprising:
   determining, by a document production coordination computer system, a document preparation resource available to perform at least one document production task, the document production task resulting in a mailing including at least one mailpiece when completed;
   determining, by the document production coordination computer system, a capacity of the document preparation resource to perform the at least one document production task;
   selecting, by the document production coordination computer system, a task to send to the available document preparation resource based at least partly on the determined capacity of the document preparation resource;
   associating an identifier with a set of task data for with the task;
   sending the task data to the document preparation resource, the task data including document data and insertion data, the task data sufficient to generate the mailing when processed by the document preparation resource; and
   receiving the completed task from the document preparation resource.

2. The method of claim 1, wherein the insertion data is an advertisement.

3. The method of claim 1, wherein the insertion data is a personalized message to the addressee to whom the document is to be sent.

4. The method of claim 1, wherein the insertion data includes a machine readable graphic that encodes information identifying documents to be bundled into a mailpiece.

5. The method of claim 1, wherein the completed task includes a machine readable graphic based upon the insertion data and the document data, wherein the machine readable graphic encodes a delivery mode including at least one from the group of regular mail, facsimile, email and internal mail.

6. The method of claim 1, wherein the completed task includes a machine readable graphic based upon the insertion data and the document data.

7. The method of claim 1, wherein the insertion data includes a text module.

8. The method of claim 1, wherein the insertion data includes positioning information describing the position of the material to be combined with the document.

9. The method of claim 1, wherein the completed task includes a chart based upon information in the document data.

10. The method of claim 1, wherein the completed task includes a digital copy of the mail piece.

11. The method of claim 1, wherein the task data includes destination information and wherein the completed task includes the document data merged with the destination information.

12. The method of claim 1, wherein the task data includes return address information and wherein the completed task includes the document data merged with the return address information.

13. The method of claim 1, wherein the completed task includes a cleansed address that conforms to a standard postal service address format.

14. The method of claim 1, wherein the completed task includes sorting information useful for determining an order of mail pieces to qualify for a reduced mailing rate.

15. A document production coordinator computer system, comprising:
   a processor; and
   a computer-readable medium storing instructions that cause the processor to:
      analyze document data to identify document production tasks for document production, each document production task resulting in a mailing including at least one mailpiece when completed;
      determine availability of document preparation resources;
      associate an identifier with a set of task data for each document production task, the task data sufficient to generate the mailing resulting from the completed document production task;
      assign document production tasks to document preparation resources based on the identified document production tasks and the determined availability of document preparation resources; and
   receive completed tasks from the document preparation resources.

16. The coordinator of claim 1, wherein the processor identifies document data and insertion data that must be processed by a resource.

17. The coordinator of claim 16, wherein the insertion data includes information for forming a machine readable graphic to be associated with a set of document data.

18. The coordinator of claim 17, wherein the machine readable graphic is an IBI or an IBI Lite.

19. The coordinator of claim 18, wherein the IBI or IBI Lite encodes information identifying documents to be bundled into a mailpiece.

20. The coordinator of claim 17, wherein the machine readable graphic machine readable graphic encodes a delivery mode including at least one from the group of regular mail, facsimile, e-mail and internal mail.

21. The coordinator of claim 15, wherein the processor discovers the identity of a document preparation resource that has unused processor capacity.

22. The coordinator of claim 15, wherein the processor discovers the amount of unused processor capacity of a document preparation resource.

23. The coordinator of claim 15, wherein the processor assigns a task to a particular document preparation resource based upon the determination that the document preparation resource is available.

24. The coordinator of claim 15, wherein the processor assigns a task to a particular document preparation resource based upon an estimate of the processing capacity needed to timely complete the document production task and the amount of unused processor capacity of the document preparation resource.

25. The coordinator of claim 15, wherein the processor sends document data to a remote document preparation resource.

26. The coordinator of claim 15, wherein the processor tracks outstanding assignments to document preparation resources.

27. The coordinator of claim 15, wherein the processor establishes a task queue for a document preparation resource.

28. The coordinator of claim 15, wherein the processor adds a task to a task-pending list for the document preparation resource when the task is sent to the document preparation resource and removes the task from the task pending list when the processor receives a signal that the completed task has been received.

* * * * *